United States Patent Office 3,783,129
Patented Jan. 1, 1974

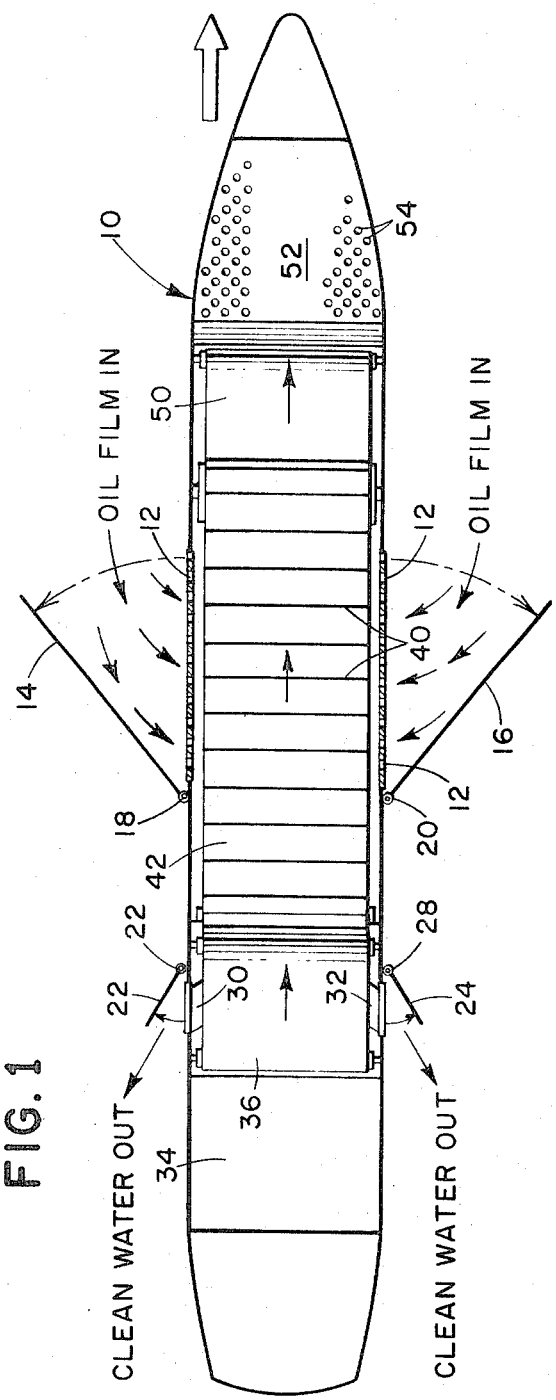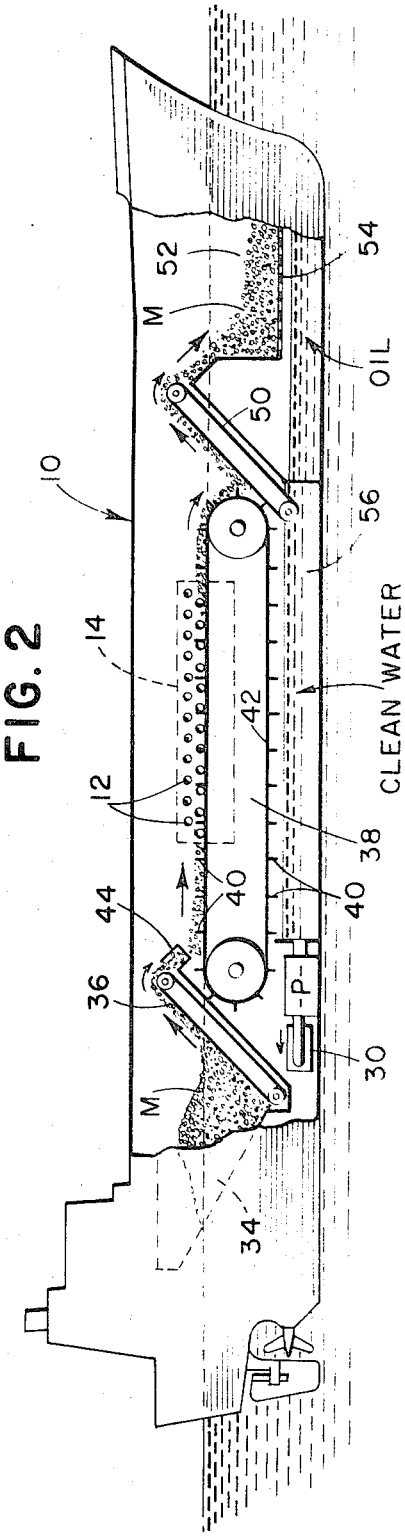

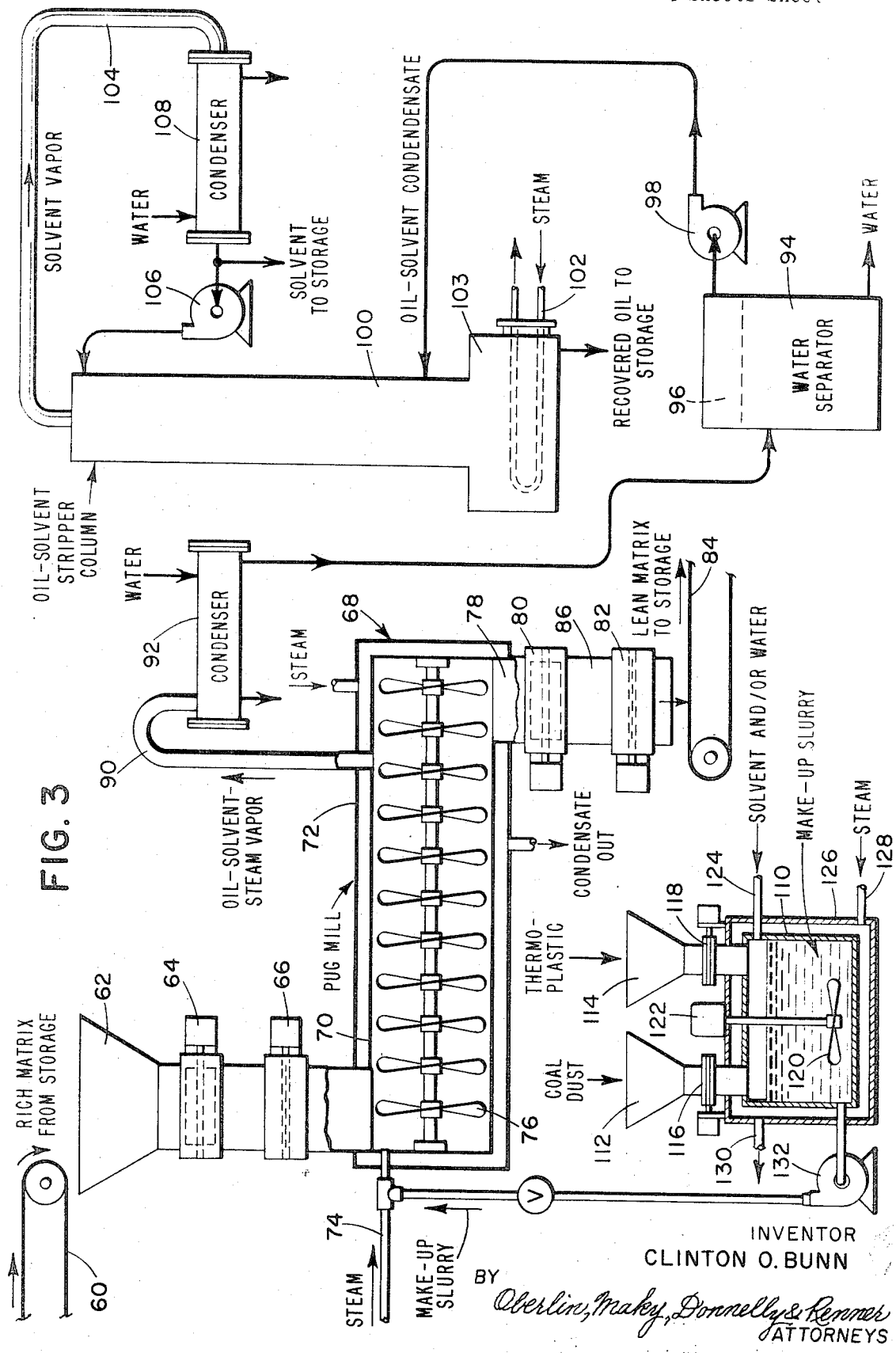

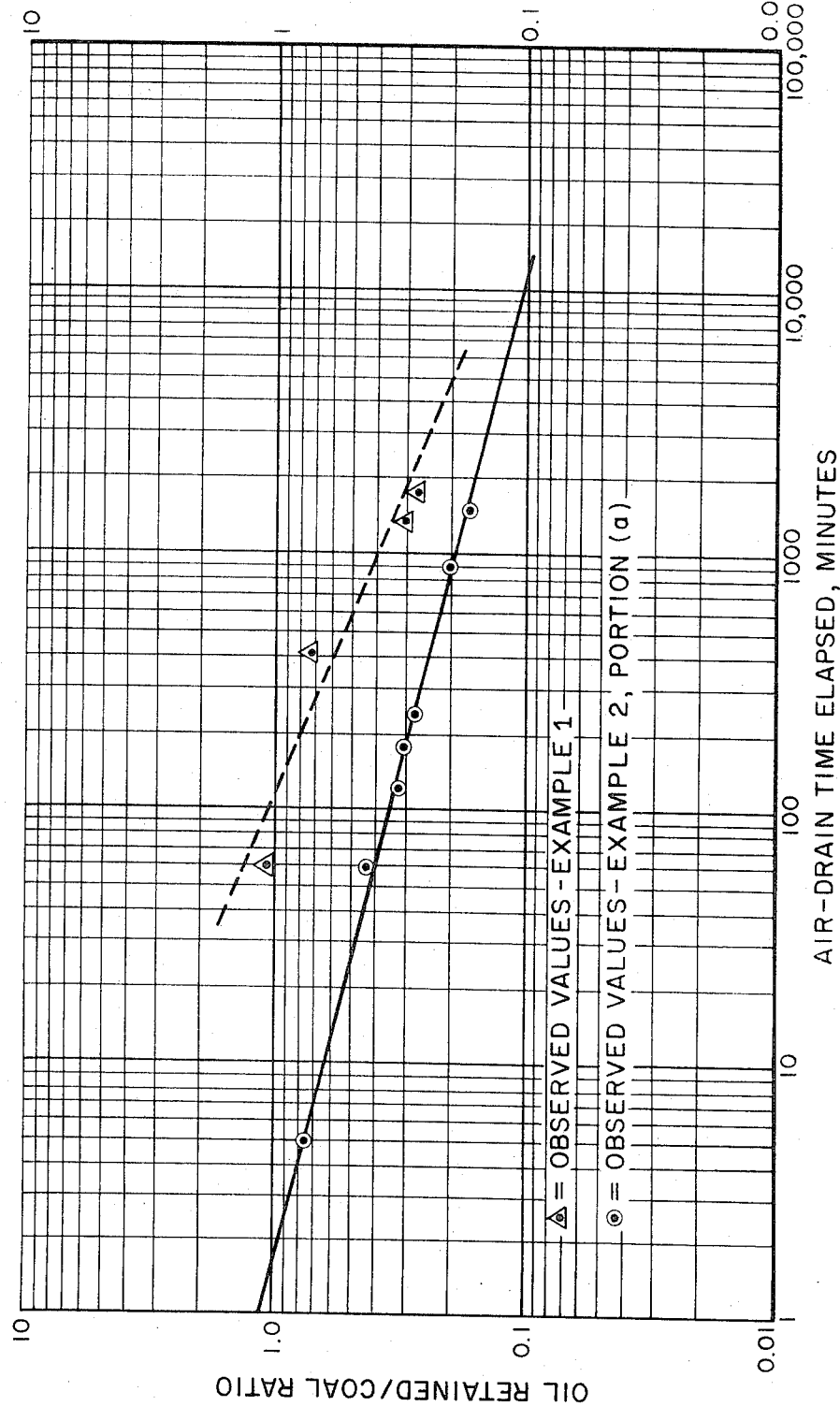

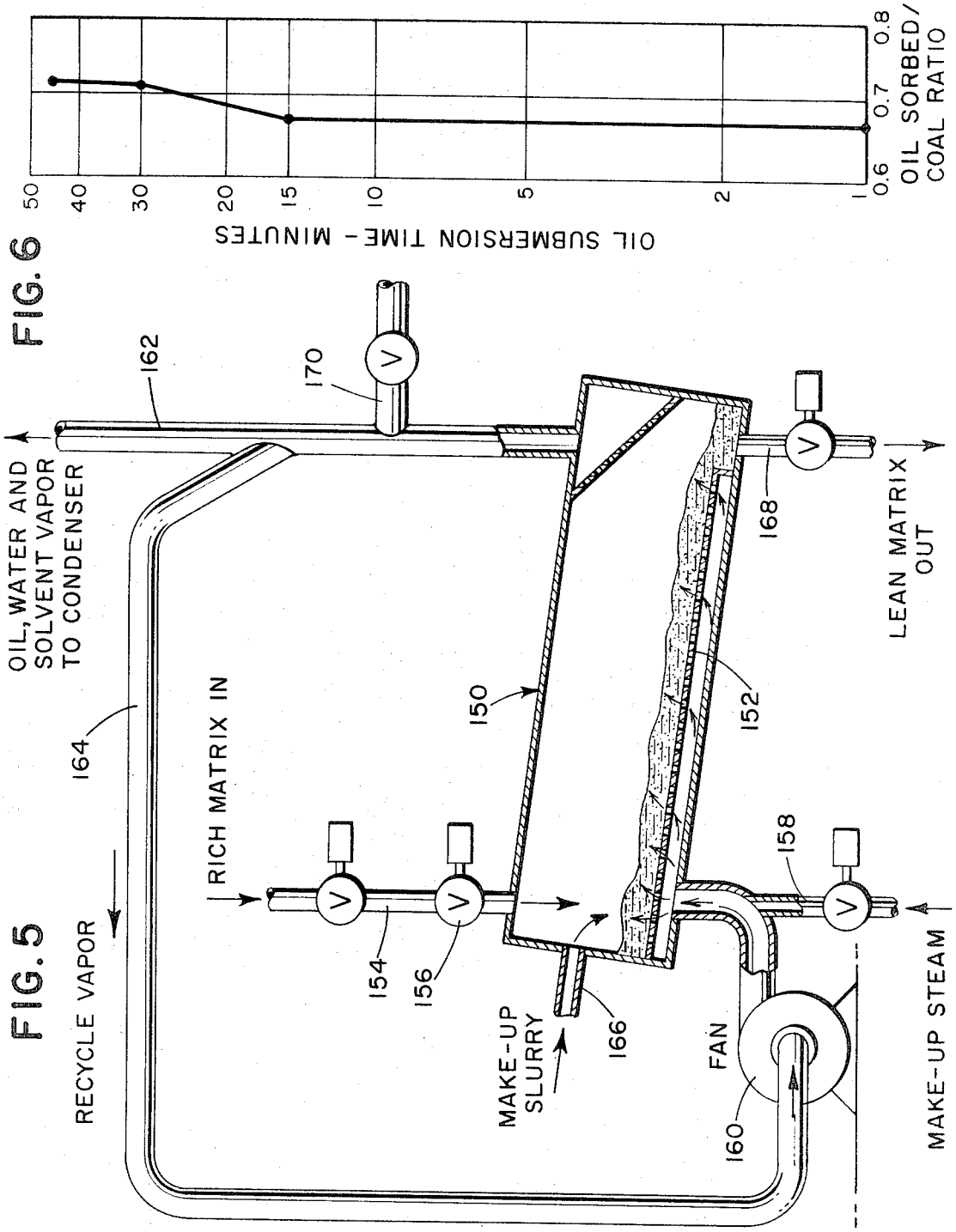

3,783,129
METHOD OF AND APPARATUS FOR THE RECOVERY OF OIL FROM WATER
Clinton O. Bunn, Denver, Colo., assignor to Col-Mont Corporation, Butte, Mont.
Filed Mar. 4, 1971, Ser. No. 121,000
Int. Cl. E02b 15/04
U.S. Cl. 210—30          17 Claims

ABSTRACT OF THE DISCLOSURE

A matrix material is provided for recovering oil from water comprised of finely divided coal particles bonded in spaced relation by polyethylene. The oil sorption capability of the matrix is exceptionally high and the matrix is highly selective to oil in the presence of oil and water. A closed system is provided for forming the matrix material and for separating the sorbed oil from the matrix material for reuse of the latter. The matrix material can be in the form of a fixed or movable bed through which the oil and water pass for selective sorption of the oil, or the material can be dispersed on the water surface and collected following oil sorption.

BACKGROUND OF THE INVENTION

The present invention relates as indicated to a method of and apparatus for recovering oil from water. Although the present invention has application under essentially any conditions where such recovery is desired, the invention can be used to particular advantage in the recovery of oil from the surface of water.

The frequency and magnitude of oil spills and oil leakage has become a cause of national concern. Increased off-shore oil exploration and production and the use of oil tankers of ever-increasing size are the primary causes of the problem, and vast expenditures of time and money have recently been expended in an effort to reduce to the extent possible the ecological unbalance which results from the oil spillages. Reference is made to my earlier applications, Ser. No. 848,039, filed Aug. 6, 1969, entitled, "Method of and Apparatus for Treating Oil Leakage," now U.S. Pat. 3,536,615, and my pending application Ser. No. 51,541, filed July 1, 1970, and entitled, "Method of and Apparatus for the Recovery of Oil from the Surface of Water," now U.S. Pat. 3,651,948.

In the first of my earlier applications, the invention disclosed therein comprised providing discreet core particles of a light weight material, combustible and sufficiently light to float on water, and coating such particles with a carbonaceous material having a high affinity for oil. The disclosed discrete particles comprised wood materials and foamed thermoplastic materials, with a fluid sealant and adhesive being employed where necessary to adhere the carbonaceous material to the surface of the core particles. The carbonaceous material preferably comprised crushed or ground coal. The resulting product possesses a high affinity for oil, and has the additional advantage of being usable as a fuel source following the collection process.

It was later discovered that if certain of materials disclosed in my first application were treated and combined in a particular manner, an oil-affinitive particle could be produced having superior oil absorption characteristics. As disclosed and claimed in my application Ser. No. 51,541, predetermined amounts of finely divided coal, polyethylene, and wood material are intimately mixed and hardened to provide a highly porous mass having a high affinity for oil. This material following use is also capable of providing relatively high heat values thereby rendering the same usable, with little modification, as a fuel source.

SUMMARY OF THE INVENTION

It has now been discovered that superior results can also be obtained through the use of but two of the three above mentioned products, namely, polyethylene and finely divided coal. In accordance with the present invention, these materials are intimately mixed while both the coal and the polyethylene are in finely divided powdered form, in the presence of water, solvent, or a combination of water and solvent. The use of solvent makes possible the dissolving or softening of the polyethylene at a lower temperature to achieve the proper binding effect of the plastic to the coal. Such mixture, when sintered or heated and dehydrated, forms a porous, cellular material of relatively high integrity and high oil absorbing characteristics. The term "absorbing" is used herein to refer both to absorbing and adsorbing as those terms are technically used. To avoid confusion in terminology, the term "sorb," "sorption" or "sorbing" will be used to describe the oil retention and collecting effect of the matrix.

Rather surprisingly, in accordance with the present invention, the oil sorbing ability of the matrix material is substantially higher than for the coal alone, which has of course long been recognized as having a relatively high affinity for oil. It is therefore a primary object of the present invention to form an oil-sorbing matrix material which is highly porous and capable of selectively sorbing oil in the presence of an oil and water mixture of the type found in oil spillages and leakage.

A more specific object of the present invention is to provide such a porous matrix comprised of predetermined ranges of finely divided carbonaceous material, for example coal dust, and polyethylene, with such materials in accordance with the present invention being intimately mixed and thereafter sintered to provide a porous, open celled matrix material. Upon contact with oil film, whether the material is spread on the surface of the water or whether the oil film is directed to or through a mass of such material, the oil is immediately selectively collected by the matrix and is retained thereby for a sufficient period of time to effect further processing of the rich or oil laden matrix.

A further object of the present invention is to provide a method of and apparatus for recovering oil from the surface of water wherein the entire recovery can be effected by on site equipment. For example, a ship can be outfitted with processing equipment which can effect collection of the oil film, subjecting the oil film to the matrix material for selective sorption of the oil, separating the oil from the matrix material, and recycling the matrix material for immediate reuse.

A still further object of the present invention is to provide a matrix material for the collection of oil in which the porosity of the material is such that the oil readily fills the voids in the matrix and is retained therein during the duration of the collection cycle. The oil can be recovered by gravity draining of the oil from the matrix preferably by equipment provided therefore on site. It has been discovered that when the matrix is removed from the oil-water liquid, some of the oil will drain from the matrix by gravitational force alone, with the amount of oil draining from the matrix varying with draining time, as will be specifically explained hereinbelow.

These and other objects of the invention will become apparent as the following description proceeds, in particular reference to the application drawings.

BRIEF DESCRIPTION OF THE DRAWINGS

FIG. 1 is a schematic plan view showing the preferred embodiment of the invention in which a single vessel is adapted to receive the oil-water film and to sorb the oil in the matrix material in accordance with the present invention, with the ship containing equipment for draining the oil from the matrix material and for recycling the latter for reuse;

FIG. 2 is a schematic side elevational view of the vessel of FIG. 1;

FIG. 3 is a diagrammatic view showing a flash distillation system for separating the undrained oil from the matrix material, and for recycling the latter to the oil sorption bed;

FIGURE 4 is a graphical illustration of the oil retained/coal ratio as such ratio relates to the air-drain time of the oil;

FIG. 5 is a diagrammatic view of a fluidized bed system, and

FIG. 6 is a graphic illustration of the time required versus oil sorption amounts.

DETAILED DESCRIPTION OF THE PREFERRED EMBODIMENT

The affinity of carbon for certain chemical materials has long been recognized, and the use of this affinity of oil for coal was the essential basis of my earlier discoveries disclosed in the above-identified applications. It is also well understood that the surface activity per unit weight increases inversely with the size of the coal particles, with relatively fine coal particles providing a substantially greater surface area per unit weight. It has long been recognized that the finer the coal the greater the surface area and thus activity, although as a practical matter in all previous applications of this very fine material, the coal which is too fine in character is very difficult to filter or otherwise mechanically treat thereby offsetting the advantage in the increased surface area.

Notwithstand the high affinity of oil for coal, the coal cannot effectively be used by itself as a vehicle for recovering oil from spills and leakages. The mean specific gravity of the coal, approximately 1.35 to 1.45 depending upon the specific characteristics of the coal, is mostly above that of oil and water thereby making it rather difficult to float all of the coal on the water surface for any period of time. Secondly, coal in the fineness desired to obtain maximum surface area is exceedingly difficult to filter or otherwise separate from a liquid, gas or solid surface, and thus becomes a major problem to the system it attempts to improve, and thereby negates the increased surface of the fine coal.

The necessity of combining the coal with a float material led to my earlier discoveries disclosed and claimed in the above-mentioned applications. In both instances, wood particles were used as the basic float material, and the coal particles adhered thereto to form the matrix material. It has now been discovered that finely divided coal particles, in the range of 200 mesh or finer, can be combined with polyethylene, in the specific manner to be set forth hereinbelow, to form a hardened matrix material which is exceptionally porous and permeable and yet capable of maintaining its integrity over relatively long periods of time. In fact, tests have shown that the integrity of the matrix material is such that following separation of the sorbed oil therefrom, the matrix material can be recycled for further use.

The invention, briefly described, comprises the preparation of a matrix of finely divided coal, polyethylene (hereinafter referred to as PE) and a sufficient amount of water and/or an organic solvent to facilitate the intimate mixing of the coal and PE. The organic solvent is for the purpose of reducing the temperature required to cause the plastic to develop the required binding characteristic which forms the porous matrix. Although for experimentation purposes, the results of which are set forth hereinbelow, such mixing was done manually, it will be understood that in commercial application requiring the production of relatively large volumes of matrix, the mixing will be by commercially feasible mixing apparatus, the description of which will be noted in detail hereinbelow.

The kind of coal and the kind of PE determine the process temperature and the use or non use of a liquid other than water in forming the slurry. As described below, the matrix is formed using high volatile sub-bituminous coal, low density PE and water in a practical though not critical forming ratio of 2:1:2 by weight, respectively, with such materials and ratio, and after mixing, which can be effected at room temperatures, or any temperature less than that at which the softening and adhesion characteristic of the plastic develops, the resultant slurry or paste is heated slowly to a temperature of 180°–200° C., and is sintered for approximately one hour at that temperature or less or until a uniform heating and fusing takes place. The matrix material is then allowed to cool and broken into particles or pellets of predetermined optimum size.

In heating the mixture to the temperatures indicated and sintering at such temperature, the PE, which is in powdered form prior to mixture, softens and becomes highly sticky or adhesive and during sintering flows slightly around the irregular projections of the finely divided coal particles. The PE thus effectively fixes, holds and sets the coal particles so that upon hardening during cooling a highly porous matrix material is formed. Such porosity and the affinity of the coal/PE matrix for oil permits sorption of oil which under some circumstances is in amounts by weight in excess of either the weight of the coal itself or the amount of oil which the coal by itself would sorb, when not in matrix form, and further when the matrix as described is broken into particles as pellets approximately 17 mm. in diameter and weighting about 1 gram. The matrix density and its size distribution in the sorbing bed affects the amount of oil sorbed and captured and quickly removed from the water and/or oil in which it has been floating. The kind of oil affects the amount sorbed. Thus oil sorbed/coal used ratio in the case of, for example, No. 2 fuel oil is greater than in the case of No. 6 fuel oil.

The characteristics of the coal/PE matrix are predictably affected by the size of the coal and the coal/PE ratio, with the amount of oil sorbed up to certain limits increasing as the coal/PE ratio increases. The practical limitation of such ratio is reached when the mechanical strength of the matrix due to the reduced amounts of PE is impaired thereby diminishing the integrity of the matrix thereby adversely affecting the reuse thereof, an important characteristic of the present invention as above noted.

The matrix material is highly selective to oil sorption in the presence of oil and water, and the matrix material can be either spread on the surface of the water or the oil and water can be directed through a movable or fixed mass of matrix material for selective sorportion of the oil. This last method is preferred in accordance with the present invention, as illustrated in the application drawings and described hereinbelow, with the process further including the gravity draining of the rich matrix material to separate the oil therefrom, and recycling the thus drained matrix material to a storage area for subsequent reuse. The separation of the oil from the matrix material may if desired be furthered by incorporating in the process distillation equipment for permitting substantially all of the sorbed oil to be separated from the matrix material.

The unique characteristics of the present invention will be readily evident from the following examples in which specified amounts of finely divided coal and PE were mixed, sintered, and cooled and hardened to form a matrix material. The matrix material was then subjected to both oil and water, in varying sequences, and the amount of sorbed oil measured and calculated. Particularly evident will be not only the remarkably high absorption by weight of the oil by the matrix material but the clear selectivity of the matrix material in the presence of oil and water.

EXAMPLE I

In this example 17.50 gms. of powdered PE were mixed with 35 gms. of finely divided coal in the presence of approximately 25 grams of tap water. The finely divided coal comprised entirely particles of —200 mesh from a readily obtainable coal source, which can be identified as Pittsburgh seam coal, indicative of the geographical source of the coal. The powdered polyethylene comprised particles of approximately 40 mesh.

The mixture was stirred to form a putty-like mass and thereafter spread over the bottom of a heating vessel. The mixture was heated slowly (for one hour) to 188° C., thereafter removed from the heat and cooled to room temperature. The matrix was thereafter broken into 18 individual pieces weighing an aggregate 23.125 gms. This entire amount was thereafter soaked for one hour in 100 milliliters of No. 2 fuel oil, followed by filtering, blotting each piece separately and carefully, and then weighing the material to determine the amount of weight and percentage of the oil retained or sorbed. There was a one hour time lapse between removing the matrix from the oil and weighing the sample. The calculations and determinations are as follows:

One hour after soak

|  | Gms. |
|---|---|
| Weight of watch glass+oil-rich matrix product | 84.820 |
| Minus (weight of watch glass) | 44.640 |
| Therefore, the weight of product+retained oil | 40.180 |

Then, $$\frac{\text{The weight of retained oil}}{\text{The weight of product}} = \frac{40.180 - 23.125}{23.125} = 0.737 \, (73.7\%)$$

and $$\frac{\text{The weight of retained oil}}{\text{The weight of coal}} = \frac{17.055}{23.125(2/3)} = 1.105 \, (110.5\%)$$

To determine the amount of gravity drainage of the oil from the matrix material as a function of time, additional weighings of the matrix product were made after predetermined time intervals of 7, 22½; and 29 hours, with the results being as followed, computed in terms of oil/coal ratio:

After 7 hours $$\frac{\text{The weight of oil retained}}{\text{The weight of coal in product}} = \frac{11.145}{23.125(0.667)} = \frac{11.145}{15.416} = 0.723 \, (72.3\%)$$

After 22½ hours $$\frac{\text{The weight of oil retained}}{\text{The weight of coal in product}} = \frac{4.175}{15.516} = 0.30 \, (30\%)$$

After 29 hours $$\frac{\text{The weight of oil retained}}{\text{The weight of coal in product}} = \frac{4.175}{15.416} = 0.30 \, (30\%)$$

In conducting Example I, the following observations were made. The heating and sintering of the matrix material at the temperatures indicated effects substantial dehydration and also improves the oil sorption of the matrix material. When the matrix was immersed in oil, the rate of sorption was relatively rapid, the oil appearing to be sorbed within the matrix material in a matter of a few minutes. When the matrix is immersed in more oil than the matrix is capable of sorbing, the oil sorption is most complete and rapid. Thus there does not appear to be any stringent time requirements within which the sorption of the oil must be effected, except that the oil must achieve contact with the matrix.

EXAMPLE II

The purpose of this example was to confirm the predicted oil sorbing properties of the matrix material as well as to ascertain the effect of the oil-sorbing characteristics of the matrix by immersion of the matrix in water both before and after the oil collecting process. The matrix was prepared in the same manner as Example I. However, in this example 70 parts by weight of coal were used with 30 parts by weight of PE, with the powdered mixture being mixed with 70 parts by weight of water to form a slurry, with the slurry being thereafter heated slowly to 180°–200° C. The material was sintered approximately one hour at that temperature and was thereafter cooled and a portion of the matrix broken into a number of pieces approximating 1 gm. each (the mixture started with comprised approximately 506 gms. of coal and 217 gms. of PE). The material was then divided into three samples, (a) for immersion in oil to determine the amount of oil sorbed; (b) for immersion first under water and then in oil to determine the effect of the prior water immersion, and (c) for immersion first under oil and then under water to determine the effect of the subsequent water immersion on the oil sorbing characteristics of the matrix. In portions (b) and (c) weighings were of course made between immersions in order to compute the effects of the sequential immersions.

The coal used in this example comprised Colorado sub-bituminous coal, selected for convenience and not to maximize the amount of oil sorbed, the coal being comprised of the following mesh sizes:

|  | Quantity, gms. | Percent |
|---|---|---|
| Retained on Tyler Screen No.: |  |  |
| 80 M | 40 | 7.9 |
| 100 M | 52.8 | 10.4 |
| 200 M | 312.4 | 61.7 |
| —200 M | 101.0 | 20.0 |
| Total | 506.2 | 100.0 |

It will thus be noted that only approximately 20% of the finely divided coal used in making the matrix samples is 200 M or smaller, as compared with 100% in Example I. Relatively less oil could therefore be expected to be sorbed in the matrix material due to the less surface area per unit weight of the coal.

The procedures and data for the three portions are as follows:

Portion (a)

This portion comprises 23.270 gms. of matrix material, with the entire amount being immersed in No. 2 fuel oil for fifteen minutes. After such time the material was filtered, drained for five minutes, weighed and the oil sorbed calculated as follows:

|  | Gms. |
|---|---|
| The weight of product+oil+watch glass | 80.075 |
| Minus the weight of product+watch glass | 67.910 |
| The weight of sorbed oil | 12.165 | and

Therefore, after five minutes drain time:

$$\frac{\text{The weight of absorbed oil}=12.165}{\text{The weight of coal}=23.270 \times 0.70} = 0.745 \, (74.5\%)$$

The matrix material was thereafter allowed freely to drain on a paper towel between weight measurements which were taken at 1, 2, 3, 4, 15 and 25 hours after the first determination, with the percentage of oil decreasing predictably with the function of time. At such intervals, the amount of oil absorbed decreased from 74.5 percent, at the first determination, to 42.8%, 32.9%, 30.6%, 27.6%, 19.9% and 16.4%, respectively.

My earlier experiments with coal dust prepared from Pittsburgh seam bituminous coal and Colorado sub-bituminous coal have shown no significant difference in their oil-sorption quantities when ground to the same degree of fineness. By intentionally increasing the bulk density of the coal dust, and thus assuredly decreasing the interstitial volume or porosity, the matrix oil sorption did in fact decrease, but remains substantial. Thus, using a less than desirable dust size classification, and using a very plentiful and least costly of materials, the matrix still collects and retains more oil than will the similar dust not in a porous matrix form.

Portion (b)

This portion comprising 27.180 gms. of matrix was immersed under water for one hour, filtered, blotted and immediately weighed. The portion was thereafter soaked in oil for 1¼ hours, filtered and weighed to determine the amount of liquids sorbed. The portion was thereafter distilled using the Stark-Dean/xylol reagent method to determine the amount of residual water, therefore permitting determination of the oil sorbed. The data and results are as follows:

|  | Gms. |
|---|---|
| The weight of portion+water+watch glass | 74.540 |
| Minus the weight of portion+watch glass | 71.820 |
| Therefore, the weight of sorbed water | 2.720 | and $$\frac{\text{The weight of water in portion (b)} = 2.720}{\text{The weight of coal in portion(b)} = (27.180)(0.70) = 19.026} = 0.141 \ (14.1\%)$$

After soaking in oil for 1½ hours

|  | Gms. |
|---|---|
| The weight of portion+resid. water+oil+watch glass | 88.440 |
| Minus the weight of portion+resid. water+watch glass | 74.540 |
| Therefore, the weight increase after oil soak | 13.900 |

The initial water absorbed is 2.72 grams, and the total remaining water is measured to be 2 grams.

The oil sorbed after water soak, portion (b) is:

$$\text{oil} = \frac{(13.900 + (2.72 - 2.0))}{\text{coal } 19.026} = \frac{14.620}{19.026} = 0.769 \ (76.9\%)$$

Portion (c)

This portion comprises 25.700 gms., and was immersed in oil for one hour, thereafter filtered and immediately weighed. The matrix was then immersed under water for one hour, filtered, drained, weighed, and thereafter distilled to observe the total water absorbed. The data and computations are as follows:

|  | Gms. |
|---|---|
| The weight of portion=25.700 gms.+oil absorbed+watch glass | 83.300 |
| Minus the weight of portion+watch glass | 70.340 |
| Therefore, the weight of sorbed oil | 12.960 | and $$\frac{\text{The weight of oil absorbed} = 12.960}{\text{The weight of coal} = (25.70 \times .70) = 17.99} = 0.722 \ (72.2\%)$$

After soaking in water for 1 hour, portion (c)+oil sorbed+water retained was distilled with xylol and 1.6 milliliters of water was observed in the Stark-Dean receiver, which was about the weight gain observed. The ratio of weight of water to weight of coal is as follows:

$$\frac{\text{The weight of water retained in treated portion (c)} = 1.6}{\text{The weight of coal} = 25.70 \times .70 = 17.99} = 0.089 \ (8.9\%)$$

The data of Example II leads to the following observations and conclusions. There is no loss in the amount of oil retained by the oil-soaked matrix after subsequent immersion under water, nor is the oil sorption of the matrix adversely affected by prior soaking in water. Moreover, the amount of oil retained by the matrix does not decrease appreciably while the matrix remains in water. This fact is of significant importance in considering the adaptability of any oil absorbing process to actual collection conditions wherein the collecting material may be subjected to both oil and water for significant periods of time.

As above mentioned, the matrix material can be presented to the oil and water either by spreading the material on the area of spillage or by directing the oil and water through a movable or fixed mass of matrix material situated, for example, in a recovery ship or vessel. The recovery vessel also includes subsequent processing equipment for separating by gravity draining the oil from the matrix material and for distilling the oil remaining after such gravty draining so as to permit recycling of the lean matrix material to the movable bed for substantially immediate reuse.

Referring to the application drawings, and initially to FIGS. 1 and 2, there is shown therein a recovery vessel generally indicated at 10. The basic construction and powering for the vessel 10 can be of conventional design, with the interior of the ship being specifically designed and equipped in accordance with the present invention.

A plurality of openings, commonly designated at 12 are formed generally intermediate the vessel and are adapted to be closed when the vessel is inoperative by baffle members 14 and 16 mounted on the side of the vessel by pivotal connections 18 and 20, respectively. The baffles 14 and 16 are shown in a fully open position in FIG. 1 and are adapted in such position to guide the oil and water into the interior of the vessel through openings 12 when the vessel is traveling in the direction indicated by the arrow in FIG. 1. When the vessel 10 is inoperative for the purpose presently intended, the baffles 14 and 16 are pivoted to a closed position contiguous the side of the vessel and retained in such position.

Outlet baffles 22 and 24 are pivotally connected on the vessel to the rear of baffles 14 and 16 by pivotal connections 26 and 28, respectively. Water entering the vessel with the oil flows outwardly of the vessel through openings 30 and 32 formed in the vessel, as indicated by the arrows in FIG. 1, with the assistance of pump P, if necessary. Although not illustrated, it will be understood that the discharge of the clean water is accomplished without the entrance of water into the vessel through the openings 30 and 32.

Located in the interior of the ship is a lean matrix storage area 34 for storing the matrix material indicated at M. A matrix feed conveyor 36 is provided at the forward, inclined end of the storage area 34 for conveying the lean matrix material M to a matrix bed conveyor 38 extending longitudinally of the ship in the intermediate portion thereof. The conveyor 38 includes spaced transverse plates or structurally adequate screen members commonly designated at 40 which cause the generally forward motion of the matrix counter to the generally backward flow of the oil-polluted water to insure integrity of the matrix bed and to maintain the counterflow action between the matrix and the oil and water. A pair of transverse distributor mechanisms or baffles 44 are provided at the discharge end of the feed conveyor 36 for both directing the material M onto the matrix conveyor and regulating the bed thickness. If desired, the plates 44 may vibrate or reciprocate to transversely level the matrix fed by conveyor 36 from the storage area.

A discharge conveyor 50 is located at the discharge end of the matrix conveyor 38 for carrying the oil-enriched matrix material into the rich matrix storage area 52, with the latter being provided with a perforated plate 54 which retains the rich matrix material while permitting gravity draining of the oil therefrom into the bottom of the storage area as illustrated.

In the operation of the recovery vessel as shown in FIGS. 1 and 2, the vessel is directed through the area of oil spillage and the oil and water are directed into the vessel through the openings 12, with the baffles 14 and 16 being open. The oil and water are directed over and through the bed of lean matrix material carried by the conveyor 38, with the oil being sorbed by the matrix material and the water gravitating through the conveyor to the water sump 56 below the matrix conveyor 38. Lean matrix material is continually delivered to the matrix conveyor 38 by the feed conveyor 36, and the enriched matrix material M is conveyed by the discharge conveyor 50 to the rich matrix storage area 52. Depending upon the extent of the oil spillage, the rich matrix material can be stored in the storage area for continued draining of the oil from the matrix material or for subsequent processing of the material by other equipment. Alternatively, when the extent of the spillage makes reuse of the matrix material a desired objective, the separation of the oil from the matrix material can be accomplished by distillation equipment housed within the vessel by which substantially all of the distillable oil can be removed from the material and the latter conveyed to the lean matrix storage area 34 for subsequent conveying to the matrix conveyor. In either event, it will be understood that as the vessel passes diametrically through the oil spillage, the vessel will be turned around and the vessel again directed through the oil film.

As above indicated, the extent of the oil spillage may require as a logistical matter the complete separation of the oil from the rich matrix material on board the vessel thereby to permit recycling and reuse of the material. There is illustrated in FIG. 3 of the application drawings equipment adapted to be carried interiorly of the vessel for accomplishing this purpose. It will of course be understood that the equipment illustrated could alternatively be land based, with the oil and water being pumped thereto or the matrix transported thereto in bulk or in bags or containers.

Referring now to FIG. 3, the processing equipment illustrated therein is shown partially schematically and is comprised of state-of-the-art components. Although the system illustrated in FIG. 3 is not shown in FIGS. 1 or 2 of the application drawings, the system likewise will be entirely self-contained within the vessel to complete the on-site cycling of the matrix material.

A rich matrix conveyor 60 communicates with the rich matrix storage area 52 and delivers the rich matrix material to a hopper 62. Plate valves 64 and 66 control the flow of the matrix material into the inlet of a pug mill or twin pug mill generally indicated at 68, being generally similar to the type widely used in the preparation of sheet asphalt for highway construction. Plate valves 64 and 66 can be of the type described and illustrated in the Sakamoto et al. U.S. Pat. No. 3,449,013.

Exterior of the pug mill housing 70 is a steam jacket 72 to which heating steam is directed for controlling the temperature within the pug mill in a conventional manner. Process steam is directed to the interior of the mill through line 74 to strip or boil off the oil in a well-known manner.

The interior of the pug mill 68 is provided with a series of blades or stirring and mixing beaters commonly designated at 76 for agitating the rich matrix delivered to the inlet thereof from the hopper 62 and advancing the same toward the outlet end of the pug mill. The outlet or discharge end 78 of the pug mill discharges the processed matrix material through plate valves 80 and 82 to a transfer conveyor 84 which transfers the lean matrix material to the lean matrix storage area 34 at the aft end of the oil sorbing bed. The plate valves 80 and 82 are similar to the plate valves 64 and 66 and function to alternately open and close the discharge pipe 86 for controlled discharge of the lean matrix material without affecting the pressure interiorly of the pug mill.

The pug mill 68 functions to intimately agitate the matrix which causes steam to contact and vaporize the sorbed oil thus stripping the rich matrix material of any oil or solvents remaining therein and also functions to convert the therein added coal dust and powdered PE binder into makeup matrix material. The oil vapors, process steam, and such solvents or other minor treating reagents found desirable as the result of a unique characteristic of the particular coal or plastic used, are discharged from the interior of the pug mill through the gas discharge pipe 90 for delivery to a water condenser 92. The matrix material after being stripped of its vaporizable components is discharged through pipe 78 as above described for recycling and reuse.

The condensed constituents emanating from the discharge end of the condenser 92 are conveyed to a water separator 94 from the bottom of which water is drawn for return to the ambient environment or to the ship's boilers. The relatively lighter liquid components comprising oil and solvent are pumped from the upper portion 96 of the separator by pump 98 to a stripper column 100. A steam line 102 is located in the reboiler or kettle end 103 at the bottom of the stripper column through which steam is admitted for heating the now liquid oil and solvent condensate and for vaporizing the more volatile solvent for discharge from the stripper through top outlet line 104. The vaporized solvent is delivered to a conventional condenser 108 for condensing the solvent vapors. The solvent condensates which are not needed for reflux to cool the upper portion of the stripper are pumped to storage by means of pump 106. The relatively higher boiling point oil is drawn off the bottom of the stripper column 100 and conveyed to an oil storage area which may be provided on the vessel or can be pumped to an adjoining vessel or other facility providing supplemental storage capacity.

The supply of lean matrix material provided by recycling the rich matrix material through the system of FIG. 3 may be augmented by the provision of means for providing make-up matrix material. A mixing tank 110 or other mixing means such as a static mixer is adapted to receive coal dust and thermoplastic material from hoppers 112 and 114, respectively, through control gates 116 and 118. An agitator blade 120 rotates within the mixer 110 and is driven by motor 122 thereby intimately mixing and forming a pumpable slurry of the materials fed to the mixing device. A water and/or solvent inlet line 124 is provided for forming the matrix slurry provided such solvent is needed for the particular plastic used as a coal dust binding agent.

An outer jacket 126 surrounds the mixing vessel 110 and steam is admitted thereto through line 128 and discharged from the jacket chamber through line 130. The slurry is pumped from the chamber by pump 132 to the stripping steam inlet line 74 for entry into the pug mill 68. By controlling the matrix slurry provided by the mixing chamber 110, the quality of the lean matrix recycled can be closely regulated.

As above indicated, the mixing of the plastic binder and finely divided coal can be accomplished by an commercially available equipment, and the system of FIG. 3 as noted employs state-of-the-art components. An alternative form of mixing and stripping equipment is shown in FIG. 5, and reference is directed thereto. This system comprises a fluidized bed generally indicated at 150 formed with a porous plate 152 extending longitudinally in the bottom thereof through which the fluidizing medium passes. The fluidized bed pressure tank is preferably downwardly inclined to facilitate gravity discharge of the processed matrix material. The pressure tank is preferably steam jacketed (not shown) for exact process control in the same manner as the pug mill in FIG. 3.

Rich matrix material is delivered to the tank 150 through inlet line 154 and feed valve 156, which may be of the type previously described and illustrated at 64 and 66 in FIG. 3. The rich matrix material can be delivered to the inlet line 154 from the rich matrix storage area in the vessel, and it is of course contemplated that the system of FIG. 5 would be installed within the vessel for separating the oil from the rich matrix and replenishing the lean matrix material to the lean matrix storage area for subsequent reuse.

The fluidizing medium in this instance is preferably steam plus recycled oil/solvent vapors which are delivered to the tank 150 through line 158 under the power of fan 160. In a manner well-known to those in the art, the rich matrix material in the tank above the porous plate 152 is suspended in a fluidized state thereby permitting the steam to intimately contact the oil absorbed within the matrix material and to vaporize the same, along with any vaporizable solvents in the material. The vapor constituents are drawn off through gas outlet line 152 to a condenser for component separation in the same manner as above described with particular reference to FIG. 3. In order to conserve heat energy, and to provide an oil-enriched vapor to the condensing system (not shown), a portion of the vapor is recycled back to the tank 150 through line 164 which communicates with the inlet side of the pump 160. Make-up coal and plastic binder in slurry form can be added to the tank 150 through feed line 166.

The rich matrix admitted to the fluidized pressure tank is stripped of the absorbed oil by the steam as the matrix material traverses the tank longitudinally toward the discharge outlet 168. Substantially all the oil and other vaporizable constituents are separated from the matrix material by the time the discharge line 168 is reached, whereby the matrix material discharged through line 168 can be conveyed directly to the lean matrix storage area.

Oil cargo vessels or tankers pump sea water from their cargo tanks, and such water is polluted with oil. A lighter ship suitably arranged would be highly useful in purifying this type of polluted water before it is discharged, either after the tanker has docked or before it has reached port. In the latter case the lighter ship would meet the incoming tanker and the tanks emptied through a hose between the two vessels. This procedure assumes critical importance in the case of the very large ships, some of which are 312,000 dwt. and sometimes load and unload in the open sea since few ports have sufficient depth to permit docking. Much larger tankers are under consideration and there is no doubt that serious pollution problems are imminent which would be alleviated or prevented by suitable lighter ships equipped with my invention. An arrangement which would be suitable for lighter ship service would combine the sorption function into an adaptation of the equipment previously described and illustrated by FIG. 3 and FIG. 5. The preferred method would be an adaptation of FIG. 5, although the equipment illustrated in FIG. 3 could be treated in a similar manner and would be effective also. Another alternative using no stripping equipment will also be described as part of my invention in the following paragraphs for the purpose outlined above.

First with reference to FIG. 5, the highly effective principle of the fluidized bed is used to cause the matrix material to sorb oil from the polluted water which for this particular adaptation, will enter the pressure tank through pipe 158 which is arranged for water as well as steam service. The polluted water flows upwardly through the perforated plate 152 which is designed for water service as well as steam. Continuing upward through the matrix, the now purified water passes out through screen 169, and discharges from pipe 170 to the surrounding body of water. The pipes and valves 154, 156 and 168 are no longer a part of the process since the same matrix alternately sorbs oil and is then stripped of oil. It is obvious that suitable valves will be required to block off the non-operative fan 160 and the condensing system while pressure tank 150 is in the sorption mode. Equally obvious is the fact that two or more such arrangements would provide for continuous operation, by alternately sorbing and stripping in sequence.

It was mentioned earlier that the lighter ship might alternatively not be equipped for stripping the matrix such that the polluted water from tanks or bilges is merely pumped through suitable bags or containers filled with the lean matrix. Further, a significant proportion of the curently estimated three billon gallons of oil spilled and discharged in the seas is reported to be from daily spills, drips and leaks by pipes, boats and barges. A very large number of these individual events are minor quantities of oil but serious pollutants and are predictable and known either as continuing circumstance as in the case of an oil pipe line leak, or otherwise as a likely event such as would be incident to routinely transferring oil, and a minor mishap possible. In any case, bags of matrix or tanks of matrix, either free floating or on a barge or tender, pressure connected to any of the numerous oil skimming or pumping devices which are now in operation, would serve to sorb the oil from the polluted water, and a purified water would emerge from the other end. The enriched matrix is then returned to the remotely located stripping facility and there stripped and reformed for further use. The matrix container is filled and emptied at the point of strip reform and shipped in its container to and from the point of use by any convenient transportation mode. Alternatively, the matrix may be transported in bulk by large vessels or other means of transport, then containerized at the point of use, with the rich matrix also returned in bulk to its point of processing. This latter method, that of bulk transport of the matrix is a very desirable characteristic of the matrix, since the matrix lends itself to rapid container filling and can be blown, pumped or shoveled readily and rapidly, and is not unduly hazardous when handled in any conventional manner.

It will be understood that FIGS. 3 and 5 have shown but two of the ways in which the matrix material can be either formed or stripped, and that other well-known apparatus, well-known to those skilled in the art of plastic powder technology can also be used, such as, for example, electrostatic spray machines, flock coating or powder flow coating apparatus, cloud chamber machines, and sintering equipment. Whichever apparatus is used it is preferred that the process serve both the purpose of stripping the rich matrix material and independently mixing the finely divided coal and plastic for replenishing the lean matrix supply.

Referring to the graphic illustrations in FIGS. 4 and 6, FIG. 4 comprises a plotting using logarithmic coordinates of the oil retained/coal ratio, shown on the ordinate axis, and air drain time relapsed, in minutes, shown on the abscissa axis. This is a plot of the actual experimental findings of portion (a), Example 2, noted above on pages 14–15. The regularity of the curve will be noted within the time limits shown. Extrapolation is therefore possible anywhere along the curve within the experimental limits.

Referring to FIG. 6, there is shown therein a plot using logarithmic coordinates of the oil sorbed/coal ratio, plotted on the abscissa axis, and oil submersion time of the matrix in minutes, shown on the ordinate axis. From the readings taken at 1, 15, 30 and 45 minutes, which comprise readings of actual experimental data corrected for ambient moisture sorption after the matrix is prepared, the substantially immediate sorption of the oil by the matrix will be apparent. Thus, sorption of the oil by the matrix material is remarkably high after merely a minute of oil contact time with the matrix material, with further contact time somewhat increasing the oil sorbed as a function of time, as clearly shown by the plot.

It will be noted that two different types of coal have been identified in the above examples. However, experiments conducted thus far indicate that the grade and type of coal do not materially affect the sorption rates of the oil. As above indicated, the fineness of the coal is important, with superior results being obtained where the coal is minus 200 mesh or finer, and the sorption quantities per unit weight of coal with reference to oil are proportionately less as the coal particles become coarser.

It will thus be seen that application has significantly advanced the art here concerned. Both the matrix material and the process and apparatus for making the same are unique.

The porous, light weight matrix material displays a highly selective preference for oil as compared to water, and the porosity and permeability of the matrix are such that the matrix material will float on water for a substantial length of time. When laden with oil, the matrix will float indefinitely on water, yet will not float at all on light oils, irrespective of whether or not the matrix is rich or lean in the sense the voids are previously filled or unfilled with oil. When contacted with oil, the oil very quickly fills the pores or voids of the matrix material. As described, the sorption of the oil by the matrix is substantially completed in approximately one minute, thereby greatly enhancing the capacity of the disclosed continuous process. The quantity of oil sorbed by the matrix is not significantly affected either by subsequent contact with water or where the matrix is subjected first to water and then to oil. A still further characteristic of the matrix is the fact that, when oil-enriched, it retains its usefulness after being subjected to steam distillation up to 220° C. for sufficient time to effect full stripping of the oil. Since the stripping process is a closed system, any operating pressure is possible, and any oil which is distillable can be distilled at sub-atmospheric pressure and at temperatures less than the softening point of the matrix of course substantial heat is saved by virtue of this readily achievable vacuum distillation. After stripping, the matrix material can be recycled for immediate reuse.

It will be obvious to those skilled in the art that minor variations can be made from the application drawings or the above description without, however, departing from the scope of the invention as defined in the appended claims. For example, it will be apparent that mixing devices in addition to those shown and described can be employed to intimately mix the powdered polyethylene and coal into a slurry form for sintering. The sintering could of course be conducted in a vessel separate from the mixing vessel. Further, solvents in addition to the type specifically mentioned can be employed to control the temperature at which the powdered polyethylene becomes relatively soft, so long as the solvent employed does not become noxious at such temperature.

I claim:

1. The method of separating oil from a combination of oil and water comprising the steps of:
   (a) mixing finely divided coal and powdered polyethylene in the presence of a liquid in sufficient amount to effect intimate mixing of said coal and polyethylene to form a matrix slurry or paste, said coal comprising at least 50% by weight of said mixture,
   (b) heating said matrix slurry to at least a temperature at which said polyethylene is in a softened state,
   (c) cooling said polyethylene to ambient temperature to adhesively bind the finely divided coal in relatively spaced relation thereby to provide a porous, light weight matrix material which has a high affinity for oil, is combustible and is sufficiently light to float on water, and
   (d) forming a layer of said matrix material for contact with said oil and water, said matrix material selectively sorbing said oil.

2. The method of claim 1 wherein said finely divided coal is −200 mesh or finer, and wherein said coal/polyethylene ratio by weight is at least 65:35.

3. The method of claim 1 wherein said mixture is heated to a temperature in the range of 180° C.–200° C. thereby softening said powdered polyethylene for adhesively binding the finely divided coal particles.

4. The method of claim 1 further including the step of collecting the oil-enriched matrix material, separating said oil from said matrix material, and recycling the lean matrix material to said layer of matrix material for absorption of incoming oil from the oil and water.

5. The method of claim 4 wherein said separating of said oil from said matrix material is accomplished by the step of flash distillation in which steam at or below 220° C. is directed through the rich matrix material thereby vaporizing said oil and providing a lean matrix material capable of immediate reuse.

6. The method of claim 5 wherein the separation of oil from said matrix material is effected in a pug mill, further including the step of providing makeup slurry of finely divided coal and powdered polyethylene to said pug mill for intimate mixing therein to form lean matrix material, and discharging said newly formed matrix material and said stripped, lean matrix material from said pug mill for subsequent cycling to said matrix layer.

7. The method of claim 5 wherein said oil is separated from said matrix material in a fluidized bed, further including the step of delivering to said fluidized bed makeup slurry comprising powdered polyethylene and finely divided coal, said slurry being intimately mixed in said fluidized bed to form lean matrix material, and discharging said newly formed lean matrix material and said stripped matrix material from said fluidized bed for subsequent delivery to said layer of matrix material.

8. The method of claim 1 wherein the oil to be separated is in the form of polluted water, and the forming of said layer of said matrix material comprises the providing of bags or containers of matrix, and pumping said polluted water through said bags or containers for removing said oil.

9. The method of claim 1 wherein said step of forming a layer of said matrix material comprises spreading the matrix material on the body of water for contact with the oil on the surface thereof, collecting the oil-laden matrix material, and separating the oil from said matrix material.

10. The method of claim 9 wherein the oil is separated from said oil-laden matrix material by gravity draining, and said drained matrix is recycled for immediate reuse.

11. Apparatus for separating oil from a combination of oil and water comprising,
   (a) means providing a bed of lean matrix material consisting of finely divided coal and powdered polyethylene fused with said coal, said coal comprising at least 50% by weight of said matrix material, said polyethylene bonding said coal particles to form a porous matrix having a high affinity for oil and high integrity for continuous reuse;
   (b) means for directing said oil and water thru said bed whereby said matrix material selectively sorbs said oil;
   (c) means for stripping said oil from said matrix material thereby to condition said matrix material for substantially immediate reuse, said stripping means comprising a mixing vessel to which said oil-enriched matrix material is conveyed, means for delivering to said mixing vessel steam at temperatures at or less than 220° C., such steam stripping said matrix material of said oil, and discharging the lean matrix material from said mixing vessel for substantially immediate reuse;
(d) means independent of said mixing vessel for forming a slurry of powdered polyethylene and finely divided coal, said coal comprising at least 50% by weight of said makeup slurry, and
(e) means for delivering said makeup slurry to said mixing vessel for intimate mixing therein to form new matrix material.

12. The apparatus of claim 11 wherein said mixing vessel is a pug mill.

13. The apparatus of claim 11 wherein said mixing vessel contains a fluidized bed through which said oil-enriched matrix material is directed and to which said makeup slurry is directed to form new matrix material.

14. The apparatus of claim 11 wherein said matrix bed and said stripping means are provided on a recovery vessel which can be located at or near the area of leakage.

15. The apparatus of claim 14 further including a lean matrix storage area, means for conveying matrix material from said lean matrix storage area to said matrix bed, a discharge conveyor for receiving oil-enriched matrix material and delivering the same to a rich matrix storage are and means conveying said oil-enriched matrix material to said stripping means for separating said oil from said matrix material to condition said matrix material for immediate reuse.

16. The apparatus of claim 15 wherein said bed of matrix material is provided by a material conveyor which receives said material from said feed conveyor and conveys the same at a predetermined speed longitudinally of the vessel, said vessel being formed with a plurality of openings in the sides thereof by which the oil and water can be admitted into the vessel in counter flow relation relative to the direction of movement of said material conveyor, said matrix material selectively sorbing said oil and said water draining downwardly through said bed for subsequent removal from said vessel.

17. The apparatus of claim 16 wherein said material conveyor is provided with a series of longitudinally spaced, transversely extending screens between which is disposed said matrix material, said screens permitting movement therethrough of said oil and water without permitting movement therethrough of said matrix bed.

References Cited
UNITED STATES PATENTS 3,651,948    3/1972    Bunn _____ 210—36

SAMIH N. ZAHARNA, Primary Examiner

B. CASTEL, Assistant Examiner

U.S. Cl. X.R.

210—40, Dig. 21